United States Patent
Hassan

(10) Patent No.: US 9,509,598 B2
(45) Date of Patent: Nov. 29, 2016

(54) APPARATUS AND METHODS FOR INTELLIGENT DEPLOYMENT OF NETWORK INFRASTRUCTURE BASED ON TUNNELING OF ETHERNET RING PROTECTION

(71) Applicant: Time Warner Cable Enterprises LLC, New York, NY (US)

(72) Inventor: Lance Hassan, Herndon, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 111 days.

(21) Appl. No.: 13/958,456

(22) Filed: Aug. 2, 2013

(65) Prior Publication Data

US 2015/0036483 A1 Feb. 5, 2015

(51) Int. Cl.
*H04L 12/437* (2006.01)
*H04L 12/723* (2013.01)
*H04L 12/703* (2013.01)
*H04L 12/24* (2006.01)

(52) U.S. Cl.
CPC ............ *H04L 45/50* (2013.01); *H04L 12/437* (2013.01); *H04L 41/0668* (2013.01); *H04L 45/28* (2013.01)

(58) Field of Classification Search
CPC . H04L 41/0654; H04L 45/50; H04L 12/437; H04L 45/28; H04L 41/0668
See application file for complete search history.

(56) References Cited

U.S. PATENT DOCUMENTS

| | | | | |
|---|---|---|---|---|
| 6,961,335 | B1* | 11/2005 | Millet et al. | 370/356 |
| 2001/0047423 | A1* | 11/2001 | Shao et al. | 709/235 |
| 2007/0014573 | A1* | 1/2007 | Wei et al. | 398/59 |
| 2008/0175239 | A1* | 7/2008 | Sistanizadeh | H04L 12/18 370/390 |
| 2008/0259873 | A1* | 10/2008 | Ahmavaara et al. | 370/331 |
| 2012/0106360 | A1* | 5/2012 | Sajassi et al. | 370/245 |

OTHER PUBLICATIONS

ITU-T G.8013/Y.1731 Series G: Transmission Systems and Media, Digital Systems and Networks; Packet over Transport aspects—Ethernet over Transport aspects, 2011.
ITU-T G.8032/Y.1344 Series Y: Global Information Infrastructure, Internet Protocol Aspects and Next-Generation Networks; Internet protocol aspects—Transport; Ethernet ring protection switching, published Feb. 2012.

\* cited by examiner

*Primary Examiner* — Omar Ghowrwal
(74) *Attorney, Agent, or Firm* — Gazdzinski & Associates, PC

(57) ABSTRACT

Apparatus and methods for intelligent deployment and transition from a first network infrastructure to a second network infrastructure. Various embodiments of the present disclosure are directed to, among other things, methods and apparatus that leverage tunneling of Ethernet ring network technologies. In one exemplary embodiment, a modified implementation of the ITU-T G.8032 data link protocol is combined with Multiprotocol Label Switching (MPLS) transport networks to provide Carrier Ethernet and Retail Ethernet services. Unlike existing network infrastructure, the exemplary MPLS network aggregates traffic between the base station (BS) and mobile switching center (MSC) within a logical ring network topology.

20 Claims, 10 Drawing Sheets

APPARATUS AND METHODS FOR INTELLIGENT DEPLOYMENT OF NETWORK INFRASTRUCTURE BASED ON TUNNELING OF ETHERNET RING PROTECTION

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technological Field

The disclosure relates generally to the field of data and content delivery. In one exemplary aspect, the disclosure relates to link aggregation technologies that enable intelligent deployment and transition from one network infrastructure to another network infrastructure.

2. Description of Related Technology

Within the telecommunications arts, the term "backhaul" refers generally to the high-speed links between the core network and the sub-networks at the "edge" of the network. Generally, backhaul services are provided by a commercial wholesale bandwidth provider who guarantees certain Quality of Service (QOS) or Service Level Agreements (SLAs) to e.g., a retailer (e.g., Internet Service Provider (ISP)), network operator (e.g., cellular network operator), etc.

As a brief aside, legacy backhaul technologies generally consist of e.g., Synchronous Optical Networking (SONET) and/or older T-Carriers (e.g., T1, T2, T3). SONET networks transfer multiple digital bit streams over optical fiber using lasers or highly coherent light from light-emitting diodes (LEDs). SONET is based on fixed size "containers" that encapsulate data; the encapsulated data can be further formatted according to e.g., traditional telephony, Asynchronous Transfer Mode (ATM), Ethernet, and TCP/IP traffic.

Many Cellular-Tower Backhaul (CTBH) networks are migrating to Multiprotocol Label Switching (MPLS) infrastructure. For example, MPLS routers can be used in base stations (BS), Mobile Switching Centers (MSC), and each node between. While the MPLS architecture is often expensive, MPLS supports the Service Level Agreements (SLA) that the mobile operators require. More directly, commercial wholesale SLAs (also referred to herein as "Carrier Ethernet") require substantially higher QoS (e.g., enhanced protection mechanisms and timing accuracy) than so-called "Retail Ethernet" services, which do not have such stringent requirements.

MPLS is a newer backhaul technology that routes variable length data from one network node to another based on path labels, rather than network addresses. In the exemplary implementation, each path label identifies virtual links (paths) between distant nodes rather than endpoint addresses. Packet-forwarding decisions are made solely on the contents of the label, without the need to examine the packet itself. MPLS routing advantageously avoids complex endpoint address lookups out of a routing table, which significantly reduces overall transport times.

Given the cost of MPLS, it is desirable to couple with another networking technology (e.g., Ethernet) to deliver data to its final destination via so-called "access networks". As with SONET, MPLS can encapsulate data for a wide range of networking technologies including e.g., Ethernet, Asynchronous Transfer Mode (ATM), Frame Relay, Digital Subscriber Line (DSL), etc.

Backhaul providers ideally seek to maximize the amount of revenue/utilization from large capital expenditures (CAPEX). Since backhaul providers have already significantly invested capital in boosting MPLS infrastructure to support Carrier Ethernet, solutions are needed to flexibly provide both Carrier Ethernet and Retail Ethernet with maximal network infrastructure reuse.

SUMMARY OF THE DISCLOSURE

The present disclosure provides, inter alia, apparatus and methods for link aggregation technologies that enable intelligent deployment and transition from one network infrastructure to another network infrastructure.

A method for enabling intelligent deployment and transition from a first network infrastructure to a second network infrastructure is disclosed. In one embodiment, the method includes: providing a distribution network comprising a plurality of nodes configured to route one or more data frames, where each of said one or more data frames comprises an encapsulated data and a routing label; providing at least one ingress device, where said at least one ingress device is configured to generate said one or more data frames and transmit said one or more data frames via said distribution network to said at least one egress device; providing at least one egress device, where said at least one egress device is configured to receive said one or more data frames via said distribution network; assigning each of said plurality of nodes and said at least one ingress device and said at least one egress device to a ring network; and transacting said one or more data frames via said ring network.

In one variant, said logical ring network comprises at least a first active path in a primary ring and a second active path in a secondary ring, where said one or more data frames are transacted via said first active path in the primary ring and said second active path in the secondary ring. Additionally, said logical ring network may further comprise at least a third path in a standby primary ring and a fourth path in a standby secondary ring, where said third path in said standby primary ring and said fourth path in said standby secondary ring are blocked. Responsive to detecting a ring failure, the method may include unblocking at least one of said third path in said standby primary ring and said fourth path in said standby secondary ring and thereafter transacting data via said unblocked at least one path.

In another variant, said ring network is configured to route said one or more data frames based on associated labels.

In a third variant, said at least one egress device comprises a cellular tower and said at least one ingress device comprises a mobile services provider (MSP) router.

In a fourth variant, said at least one egress device is configured to provide retail Internet service and said at least one ingress device comprises an internet services provider (ISP) router.

In a fifth variant, said ring network services a combination of Retail and Carrier Ethernet applications characterized by distinct Service Level Agreements (SLAB).

A premises apparatus is disclosed. In one embodiment, the premises apparatus includes: a first network interface configured to communicate with a backhaul network comprising at least a ring network; a consumer premises interface configured to communicate with an edge network; a processor; and a non-transitory computer readable medium comprising at least one computer program. In one exemplary embodiment, the computer program is configured to, when executed by said processor, cause said premises apparatus to: receive at least one data frame from a first other node of said ring network; transmit said at least one data frame to a second other node of said ring network; and determine when said at least one data frame comprises at least one packet for said edge network; and route said at least one packet via said edge network.

In one variant, said first network interface comprises a data link layer interface. One such implementation may include a Multiprotocol Label Switching (MALS) compliant interface, and/or operate within a ring network that includes a ITU-T G.8032 compliant ring network.

In one variant, said edge network comprises a cellular tower site.

A network router apparatus is disclosed. In one embodiment, the network router apparatus includes: a first network interface configured to connect to a backhaul network comprising at least a ring network; a processor; and a non-transitory computer readable medium comprising at least one computer program. In one exemplary implementation, the computer program is configured to, when executed by said processor, cause said network router apparatus to: receive at least one data frame from a first other node of said ring network, where said at least one data frame comprises a first label associated with said network router apparatus and an encapsulated data; replace said first label with a second label associated with a second other node of said ring network; and transmit said at least one data frame to said second other node of said ring network.

In one variant, said at least one data frame comprises a three (3) label stack which includes: (i) a first stack layer configured to provide routing information, (ii) a second stack layer configured to specify a transport network service endpoint, and (iii) a third stack layer configured to identify an appropriate private network for said encapsulated data. Each of the first, second, and third stack layers are associated with corresponding quality of service (QoS) information useful for prioritization within the associated layer.

In a second variant, said network router apparatus supports both label based routing and network address based routing.

An aggregator apparatus is disclosed. In one embodiment, the aggregator apparatus includes: a first network interface configured to connect to a backhaul network comprising at least a ring network; a backbone interface configured to connect to a backbone network; a processor; and a non-transitory computer readable medium comprising at least one computer program. In one embodiment, the computer program is configured to, when executed by said processor, cause said aggregator apparatus to: receive at least one data frame from a first other node of said ring network; transmit said at least one data frame to a second other node of said ring network; and determine when said at least one data frame comprises at least one packet for said backbone network; and route said at least one packet via said backbone network.

A method of operating a distribution network comprising a plurality of nodes configured to route one or more data frames comprising an encapsulated data and a routing label is disclosed. The network includes: at least one ingress device configured to generate said one or more data frames and transmit said one or more data frames to said at least one egress device, the at least one egress device configured to receive said one or more data frames. In one embodiment, the method includes: assigning each of said plurality of nodes and said at least one ingress device and said at least one egress device to a ring network; and transacting said one or more data frames via said ring network. In one such variant, the ring network is closed over a Multiprotocol Label Switching (MPLS) transport network.

In a further aspect of the disclosure, a method for operating a content distribution network is disclosed. In one embodiment, the method includes: (i) enabling at least one user interface to communicate with an edge network; (ii) receiving at least one data frame from a first other node of a backhaul network, the backhaul network including at least a ITU-T G.8032 compliant logical ring network; (iii) transmitting the at least one data frame to a second other node of the ITU-T G.8032 compliant logical ring network; (iv) determining when the at least one data frame comprises at least one packet for the edge network; and (v) routing the at least one packet via the edge network.

In one variant, the at least one user interface includes a Multiprotocol Label Switching (MPLS) compliant interface. In another variant, the edge network includes a cellular tower site.

In a further aspect of the disclosure, a non-transitory computer-readable apparatus is disclosed. In one embodiment, the non-transitory computer-readable apparatus includes media implemented to store a computer program thereon. In one variant, the computer program includes a plurality of instructions which are implemented to, when executed by a processor of a network apparatus: (i) receive via an interface of the network apparatus at least one data frame originated from a first node of a backhaul logical ring network; (ii) insert into the data frame a second label associated with a second node of the logical ring network in place of a first label associated with a network router; (iii) transmit the at least one data frame to a second node of the backhaul logical ring network; (iv) determine that the at least one data frame comprises at least one packet for a cellular site associated with an edge network; and (v) route at least the at least one packet via the edge network to the cellular site. In one implementation, the logical ring network is ITU-T G.8032 compliant.

In yet a further aspect of the disclosure, an apparatus is disclosed. In one embodiment, the apparatus includes: (i) a first network interface implemented to communicate with a backhaul network comprising at least a logical ring network; (ii) an interface configured to communicate with an edge network; (iii) a processor; and (iv) a non-transitory computer readable medium comprising at least one computer program.

In one variant, the at least one computer program is implemented to, when executed by the processor, cause the apparatus to: (i) receive at least one data frame from a first other node of the logical ring network; (ii) transmit the at least one data frame to a second other node of the logical ring network; (iii) determine when the at least one data frame comprises at least one packet for a cellular site associated with the edge network; and (iv) route the at least one packet via the edge network to the cellular site. In one implementation, the first network interface includes a Multiprotocol Label Switching (MPLS) compliant interface. In another implementation, the logical ring network is ITU-T G.8032 compliant.

These and other aspects of the disclosure shall become apparent when considered in light of the disclosure provided herein.

Figure 1A:
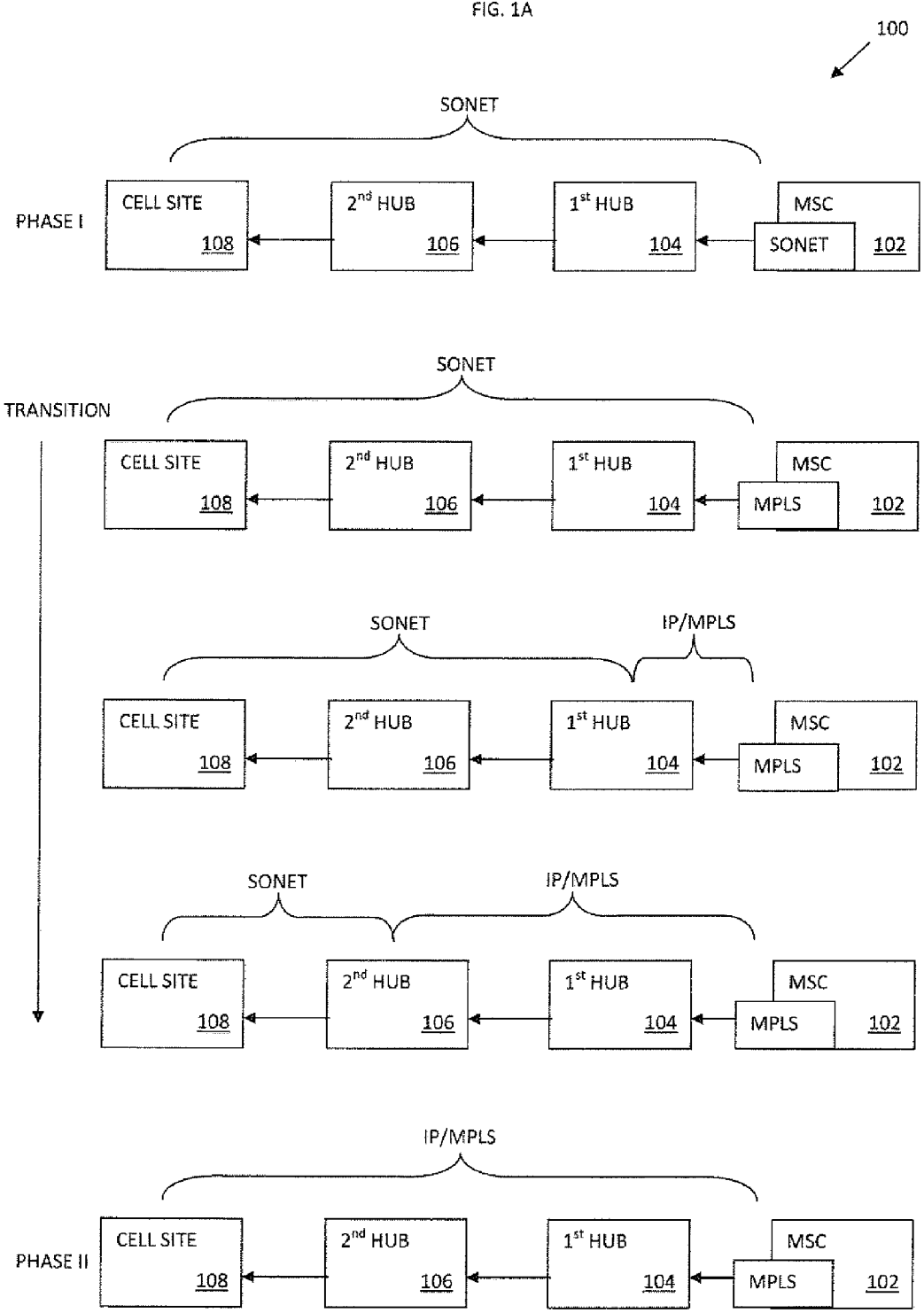
FIG. 1A is a graphical representation of one exemplary embodiment of a Cellular-Tower Backhaul (CTBH) network migration from Phase I to Phase II, illustrating a staged deployment of capital equipment, in accordance with various aspects of the present disclosure.

All Figures © Copyright 2012-2013 Time Warner Cable, Inc. All rights reserved.

DETAILED DESCRIPTION

Reference is now made to the drawings wherein like numerals refer to like parts throughout.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "computer program" or "software" is meant to include any sequence or human or machine cognizable steps which perform a function. Such program may be rendered in virtually any programming language or environment including, for example, C/C++, FORTRAN, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (FURNACE), and ITV Personal Computers.

As used herein, the term "DOCSIS" refers to any of the existing or planned variants of the Data Over Cable Services Interface Specification, including for example DOCSIS versions 1.0, 1.1, 2.0 and 3.0.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FIREWIRE (e.g., FW400, FW800, etc.), USB (e.g., USB2), Ethernet (e.g., 10/100, 10/100/1000 (Gigabit Ethernet), 10-Gig-E, etc.), MOCA, Coaxsys (e.g., TVnet™), radio frequency tuner (e.g., in-band or OOB, cable modem, etc.), WI-FI (802.11), WIMAX (802.16), PAN (e.g., 802.15), or IRDA families.

As used herein, the term "node" refers to any functional entity associated with a network, such as for example: CPE, server, gateway, router, Optical Line Terminal (OLT), Optical Network Unit (ONU), etc. whether physically discrete or distributed across multiple locations.

As used herein, the term "server" refers to any computerized component, system or entity regardless of form which is adapted to provide data, files, applications, content, or other services to one or more other devices or entities on a computer network.

As used herein, the term "wireless" means any wireless signal, data, communication, or other interface including without limitation WI-FI, BLUETOOTH, 3G (3GPP/3GPP2), HSDPA/HSUPA, TDMA, CDMA (e.g., IS-95A, WCDMA, etc.), FUSS, DSSS, GSM, PAN/802.15, WIMAX (802.16), 802.20, narrowband/FDMA, OFDM, PCS/DCS, LTE/LTE-A, analog cellular, CDPD, satellite systems, millimeter wave or microwave systems, acoustic, and infrared (i.e., IrDA).

Overview

Various embodiments of the present disclosure are directed to methods and apparatus that leverage existing data transfer protocols between adjacent nodes in a network (generally referred to as "Layer 2" or the "Data Link Layer") to provide tunneling of e.g., Ethernet ring protection. As described in greater detail hereinafter, the exemplary solutions described herein provide comparable "access network" protection to existing technologies (e.g., MPLS), consistency in operational support models, and significantly reduced costs for backhaul providers. More directly, the principles disclosed herein advantageously offer one or more of (i) consistent access architecture for all commercial Ethernet services (e.g., Carrier Ethernet and Retail Ethernet), (ii) reduced operational expenditure (OPEX) (as compared to supporting distinct Carrier Ethernet and Retail Ethernet infrastructures), (iii) reduced capital expenditures (CAPEX) (as compared to the existing access devices used for Carrier Ethernet applications), and/or (iv) consistent Performance Monitoring (PM) and Service Activation Testing (SAT) solutions for all commercial Ethernet services (both Retail and Wholesale Carrier Ethernet installations).

In one exemplary embodiment of the present disclosure, a modified implementation of the ITU-T G.8032 data link protocol is tunneled via Multiprotocol Label Switching (MPLS) transport networks to provide a logical Ethernet "ring" network between each Consumer Premises Equipment (CPE) and two "Layer 2" (L2) Aggregator Devices. Unlike existing network infrastructure, the exemplary ring network tunnels traffic between at least an ingress point or node (such as a base station (BS)) and at least an egress point or node (e.g., a mobile switching center (MSC)) to form a single logical ring network topology that spans a distribution network infrastructure. More directly, rather than closing the network ring topology at the "access network" (as is done in existing ring networks), the ring is closed at the ingress and egress nodes (such as a BS and MSC), and traffic is logically tunneled via an intervening distribution network that connects the ingress and egress nodes. In this manner, traffic can be transferred through the nodes of the ring network as if the nodes were directly connected to one another, regardless of the operation of the intervening distribution network (e.g., a MPLS transport network).

The exemplary embodiments of the network infrastructure set forth herein advantageously do not require significant new investment in capital equipment, and can be deployed in an incremental manner. Additionally, each node of the exemplary distribution network only needs to support the tunneling protocol (e.g., data link protocol capabilities (Layer 2 capabilities)) whereas existing networks require each intermediary node to perform full network address resolution (Layer 3 capabilities). These lower capabilities requirements directly translate to less expensive equipment that can be used and/or deployed.

Moreover, existing vendor products typically cater to either Carrier Ethernet or Retail Ethernet, and hence are frequently not interchangeable. While all single vendors ensure that their products are compatible with their own product offerings, vendor cross-compatibility is not assured, and such issues may complicate e.g., performance monitoring, SLA compliance, etc. The ability to source interchangeable components from multiple different vendors ensures market competition and promotes technical innovation. The various disclosed embodiments do not require specialized functionality, and can be easily handled by commodity components, thus greatly reducing or even eliminating cross-compatibility issues and enabling significant multi-source opportunities.

Timing synchronization is often a critical requirement for most Carrier Ethernet applications (e.g., cellular network deployments, etc.). Similarly, from a network management perspective, scalable solutions for adding additional bandwidth are highly desirable. As described in greater detail herein, the disclosed embodiments further greatly simplify both timing synchronization and scalable network deployment. Still other synergies described in greater detail hereinafter will be made apparent to those skilled in the art upon reading and understanding the present specification.

Detailed Description of Exemplary Embodiments

Exemplary embodiments of the apparatus and methods of the present disclosure are now described in detail. While these exemplary embodiments are described in the context of the aforementioned Cellular-Tower Backhaul (CTBH) network system architecture, the general principles and advantages of the disclosure may be extended to other types of networks and architectures, whether implemented within the core network, backhaul, edge networks, etc., the following therefore being merely exemplary in nature.

It will also be appreciated that while described generally in the context of a commercial wholesale bandwidth provider with Carrier Ethernet and Retail Ethernet capabilities, the present disclosure may be readily adapted to other types of environments (e.g., commercial/enterprise, government/military, etc.) as well. Myriad other applications are possible.

While the terms "ingress" and "egress" are used with reference to the various functions of the nodes described herein, it should be appreciated that such usage is provided solely for clarity. In fact, it is readily appreciated that typical nodes, applications, and/or transactions are bidirectional in nature, and thus nodes may possess both ingress and egress capabilities.

Other features and advantages of the present disclosure will immediately be recognized by persons of ordinary skill in the art with reference to the attached drawings and detailed description of exemplary embodiments as given below.

Exemplary Network Architecture—

Figure 1B:
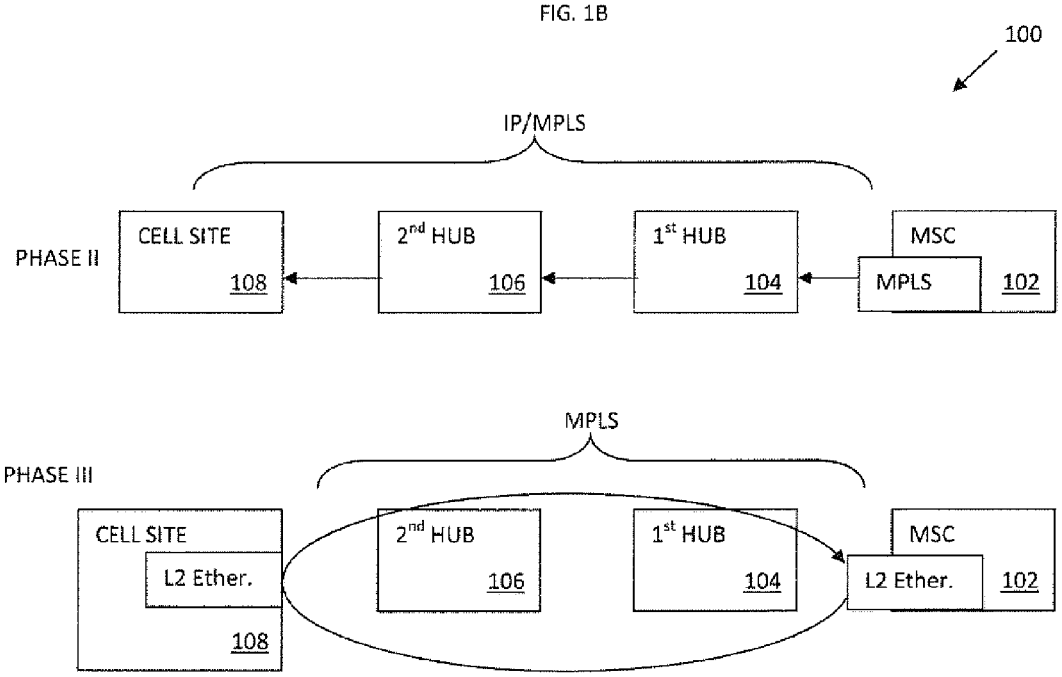
FIG. 1B is a graphical representation of one exemplary embodiment of a CTBH network migration from Phase II to Phase III, illustrating a transition from one network technology to another network technology, in accordance with various aspects of the present disclosure.

Referring now to FIGS. 1A and 1B, one exemplary configuration of a Cellular-Tower Backhaul (CTBH) network migration 100 is illustrated. The CTBH network comprises: a mobile switching center (MSC) 102 (which links to the Mobile Service Provider (MSP)), a primary hub 104, a secondary hub 106, and a cellular site (base station (BS) deployment) 108. As shown, each phase of the CTBH network migration, replaces existing network infrastructure components to keep pace with e.g., technology limitations, new requirements and solution enhancements, etc.

Referring now to the Phase I Architecture of FIG. 1A, the backhaul is provided via Synchronous Optical Networking (SONET)/Synchronous Digital Hierarchy (SDH) components which do not support Multiprotocol Label Switching (MPLS) functionality.

FIG. 1A further depicts the transition from Phase I to Phase II being performed by successively replacing legacy SONET/SDH components with IP/MPLS capable components. Phase II is characterized by full IP/MPLS connectivity from the MSC to cellular site. Phase II deployments maintain a separation between Wholesale Ethernet and Retail Ethernet, due to the differences in SLA requirements and access technologies. It should be noted that, multi-homed cell sites (a cellular network operator requirement) require IP/MPLS Layer 3 CPE deployments in Phase II where multi-home capabilities were not available with Ethernet. In Phase III (described hereinafter), the cell site can directly transition to IP/MPLS Layer 2 Ethernet CPE deployments with ITU-T G.8032 support for Ethernet rings.

Figure 2:
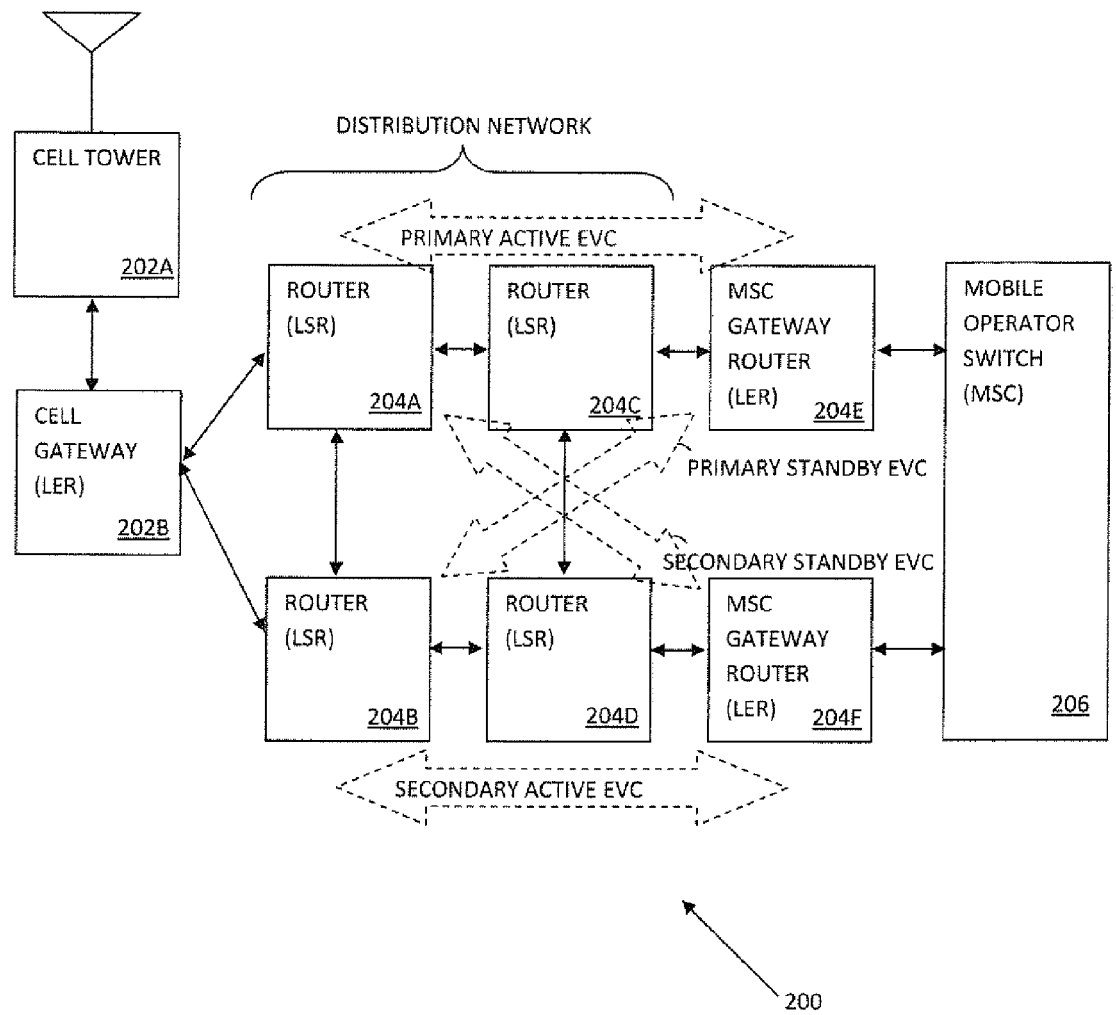
FIG. 2 is a detailed logical block diagram of an exemplary Phase II CTBH architecture, in accordance with various aspects of the present disclosure.

Referring now to FIG. 2, a more detailed representation of an exemplary configuration of Phase II CTBH architecture is illustrated for clarity. The cellular tower 202A is connected via physical Ethernet (e.g., a gateway) to the components of the distribution hubs (primary and secondary hubs) 204 and the mobile operator switch (MSC) 206 (e.g., via a gateway). Logically, the network consists of four (4) bidirectional Ethernet Virtual Circuits (EVC) (or virtual local area networks (VLANs)): a primary active EVC, and a secondary active EVC, a primary standby EVC, and a secondary standby EVC. In some implementations, the routers may additionally be functionally categorized as a Label Switch Routers (LSR) that are configured to add a tunnel label to forward traffic through a MPLS distribution network, or Label Edge Routers (LER) that are configured to add a service label that is configured to direct traffic to the appropriate customer interface.

As a brief aside, due to various contractual requirements for service e.g., guaranteed data rates, etc. existing traffic generally provides multiple hierarchical layers of service redundancy. For example, as used herein, the terms "active" and "standby" refer to the distribution network operator's physical redundancy circuits. During normal operation the active circuits transact data; however, in the event of a distribution network failure, the affected data traffic is switched over to their respective standby circuits. Similarly, the terms "primary" and "secondary" refer to logical EVCs provided by the Carrier Ethernet reseller (e.g., Wholesale and/or Retail network providers). The commercial Ethernet reseller may provide network protection via e.g., Bidirectional Forwarding Detection (BFD), to determine when a network fault requires a switch from the primary EVC to the secondary EVC. It should be appreciated that more complex/robust schemes may incorporate additional levels of backup e.g., tertiary, quaternary, etc.

Each EVC is characterized by an exemplary Label Distribution Protocol (LDP) which transfers label mapping information necessary for MPLS routing. In the exemplary configuration, two routers with an established session (called "LDP peers") are provided, and the exchange of information is bidirectional. LDP is used to build and maintain Label Switched Path (LSP) databases that are used to forward traffic through MPLS networks. Each path is configured based on criteria in the forwarding equivalence class (FEC).

A path begins in the illustrated case at a label edge router (LER) or "ingress router", which makes a decision on which label to prefix to a packet based on the appropriate FEC. The last router in an LSP is called an "egress router". Routers in between the ingress and egress routers are herein referred to as "transit routers" or "label switch routers (LSRs)". Each router forwards the packet along to the next router, which forwards it to the next router, etc. The penultimate router (second to last router in the path) removes the outer label and the last router in the path (i.e., the egress router) removes the inner label from the packet and forwards the resulting frame based on an appropriate network protocol (for example Ethernet for a Carrier Ethernet network). Since the LSP transactions are performed at the Data Link Layer (Layer 2) and are transparent to networking protocols (Layer 3), an LSP is also sometimes referred to as an MPLS tunnel and/or "pseudo-wire".

As used herein, "Layer 1" (or the "Physical" Layer) refers without limitation to the hardware transmission technology of the network. "Layer 2" (or the "Data Link" Layer) refers without limitation to a protocol layer that transfers data between adjacent network nodes in a wide area network or between nodes on the same local area network segment. Layer 2 functions include among other things: media access control (MAC addressing), flow control and error checking. "Layer 3" (or the "Data Link" Layer) refers to a protocol layer that routes data throughout the network based on network address resolution, etc. Layer 3 functions include among other things: route determination, and packet forwarding, etc. It should be noted that according to the foregoing descriptions, Ethernet frames constitute a Layer 2 data structure. Each Ethernet frame includes e.g., a preamble, a frame delimiter, a MAC destination address, a MAC source address, a data payload, and a frame check sequence. The Ethernet frame payload typically contains e.g., TCP/IP addressing, but could be used to encapsulate other protocols.

Referring back to FIG. 2, each cellular tower 202A is connected to a cellular gateway 202B which is connected to two (2) geographically-redundant hub site routers (204A, 204B) via Ethernet point-to-point links. Typically, the four (4) EVC (primary active EVC, primary standby EVC, secondary active EVC, secondary standby EVC) are configured using the remote system IP of each of the MSC routers (204E, 204F). In some implementations, an Interior Gateway Protocol (IGP) may be used to determine the best path. Two (2) LSPs are configured for each tower virtual local area network (VLAN) and each LSP provides an alternate path to one of the two (2) redundant MSC gateway routers (204E, 204F). As shown, the primary and secondary pseudo-wires are stitched to the core transit service at the ingress router. The resulting configuration provides a primary VLAN that is statically configured to use the LSP, traversing a first path (from 204A to 204E) that is configured to perform fail-over switching to a secondary LSP traversing a second path (from 204B to 204E).

Similarly, the secondary VLAN is statically configured to use the LSP traversing a first port (from 204B to 204F) that is configured to perform fail-over switching to a secondary LSP traversing a second port (from 204A to 204F).

In Phase II, the distribution hubs of the exemplary configuration utilize the Resource Reservation Protocol (RSVP) that enables either hosts or routers to request or deliver specific levels of quality of service (QoS) for application data streams or flows. RSVP defines how software applications request reservations and relinquish the reserved resources. Typical RSVP operation requires a defined resource allocation reserved in each node along the LSP.

Referring back to FIG. 1B, from Phase II, the transition to Phase III results in the MSC 102 and the cellular sites 108 converting to Layer 2 type devices that support ITU-T G.8032 (e.g., replacing IP/MPLS Layer 3 CPEs with IP/MPLS Layer 2 CPEs, etc.) and the CTBH is converted to a ring network, where the ring is "closed" at the MSC and cellular sites (i.e., the ring spans each node of the CTBH). From Phase III on, the CTBH networks (Carrier Ethernet) have the same infrastructure technology as Retail Ethernet; thus a common Ethernet infrastructure can support operational models for both Carrier Ethernet and Retail Ethernet.

Figure 3A:
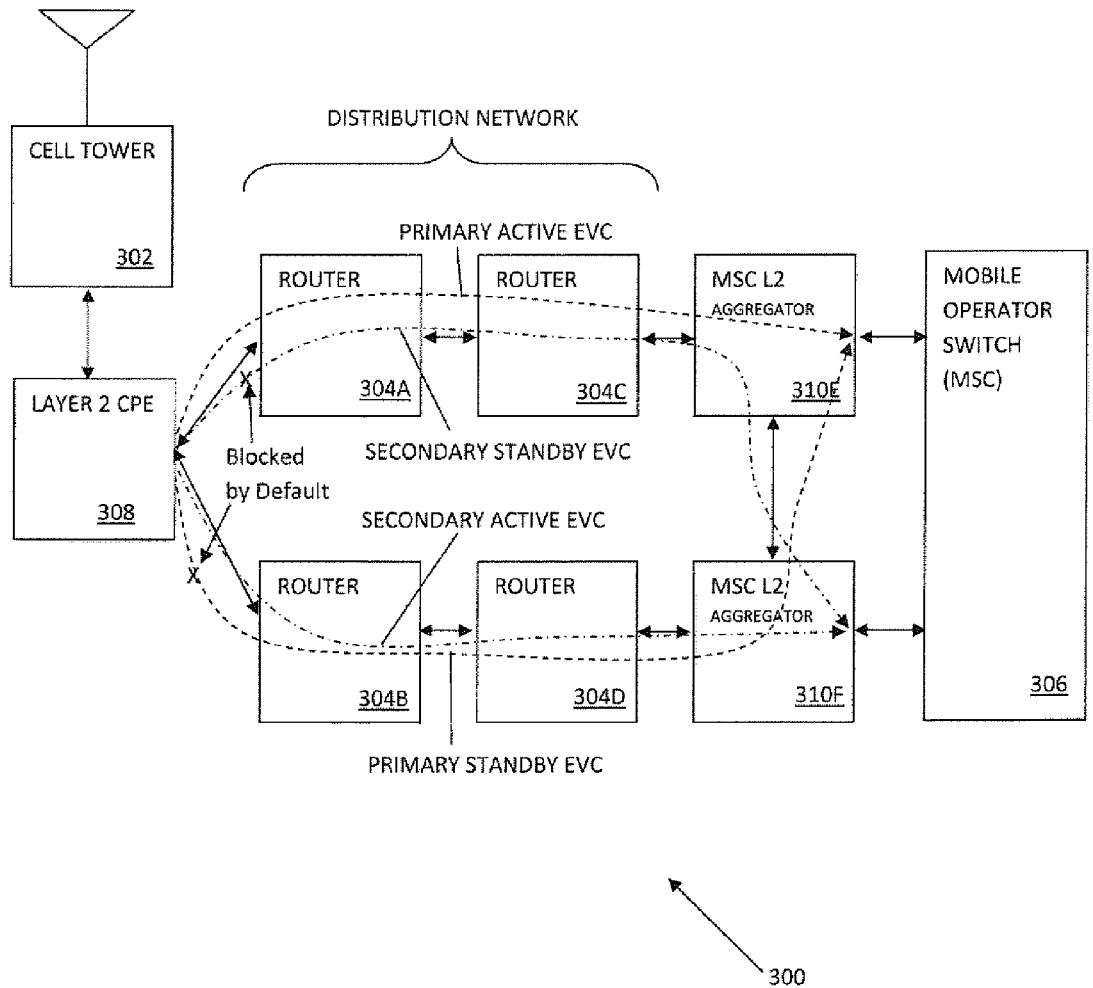
FIG. 3A is a detailed logical block diagram of an exemplary Phase III CTBH architecture, in accordance with various aspects of the present disclosure.

Referring now to FIG. 3A, a more detailed representation of the exemplary Phase III CTBH architecture is illustrated for clarity. As shown, the ingress and egress routers have been replaced with Data Link Layer (Layer 2) equipment. Additionally, as shown the Layer 2 routers at each end of the service are configured to "close" an ITU-T G.8032 ring for each EVC (VLAN). In one embodiment, at least a portion of the ITU-T G.8032 rings (e.g., the standby circuits) are "blocked" at the Layer-2 CPE devices by default (at the cellular tower site) to prevent a network "loop"; the primary active EVC is handled over a first network interface and the secondary active EVC is handled on a second network interface. Once a fault has been detected (e.g., in either the primary active EVC or secondary active EVC), the "blocked" ITU-T G.8032 ring (e.g., the standby circuit) is unblocked, to recover connectivity for the affected EVC.

Unlike the Phase II CTBH architecture of FIG. 2, the Phase III CTBH architecture of FIG. 3A implements a data link layer logical ring network with the Layer 2 CPE 308, and Layer 2 Aggregators 310E, 310F. Specifically, the logical ring network is tunneled from the Layer 2 CPE 308, through the distribution hubs 304, to the Layer 2 Aggregators 310E, 310F. For example, the primary active EVC consists of the link from the Layer 2 CPE 308, to the distribution hubs (from 304A to 304C) to a first Layer 2 Aggregator 310E. The primary standby EVC is then used to close the ring. The primary standby EVC consists of the link from the Layer 2 CPE 308, to the distribution hubs (from 304B to 304D) to the second Layer 2 Aggregator 310F, then to the first Layer 2 Aggregator 310E. Both the primary active EVC and primary standby EVC have the same ingress and egress points (Layer 2 CPE 308 and Layer 2 Aggregator 310E). The secondary active EVC and secondary standby EVC have similar routing between the Layer 2 CPE 308 and the Layer 2 Aggregator 310F.

Moreover, in Phase III, the distribution hubs utilize the LDP over RSVP (LDPoRSVP) also known as "tunnel-in-tunnel". Unlike RSVP, LDPoRSVP utilizes a three (3) label stack which includes: (i) an RSVP label configured to provide RSVP Fast Re-Routing (FRR), (ii) a LDP label configured to provide MPLS end-to-end services over hierarchical networks, and (iii) a Virtual Private Network (VPN) label configured to identify the appropriate VLAN network for the data. Specifically, the RSVP label is processed by each MPLS router node within the network as the packet traverses the network, The LDP label is processed by the Provider Edge (PE) Routers (e.g., the ingress and egress routers), and the VPN label assures the final VLAN destination. Using LDPoRSVP automates the manual process of stitching pseudo-wires together at IGP area boundaries, while ensuring sub-50 ms restoration of pseudo-wires within each MPLS transport network defined by an IGP area or level. In one such case, the IGP protocol operates according to the Open Shortest Path First (OSPF) protocol. OPSF gathers link state information from available routers and constructs a topology map of the network. The topology determines the routing table presented to the Internet Layer which makes routing decisions based on the destination IP address found in IP packets, plus any additional information the routing protocol used within an network domain (area, level, etc.) may consider (i.e. cost, bandwidth, delay, load, reliability, maximum transmission unit (MTU), etc.).

The multi-tiered label structure of LDPoRSVP provides multiple benefits over LDP. For example, LDPoRSVP enables Fast Re-Routing (FRR) in multi-area topologies, and dynamic creation of EVCs between service endpoints that may reside in different network areas or levels. More generally, LDPoRSVP enables network convergence for Retail and commercial Carrier Ethernet services, and provides a framework for future centralization of all commercial Ethernet services in the future (e.g., Cellular-Tower Backhaul (CTBH), MetroE (Metro Ethernet), Ethernet Everywhere and EPON (Ethernet Passive Optical Network)/DPOE (DOCSIS Provisioning over Ethernet), etc.). Specifically, LDPoRSVP supports hierarchical networks which rely on LDP to dynamically stitch together pseudo-wires that pass from one distinct Interior Gate Protocol (IGP) network domain to another. RSVP is then used within each domain to ensure fast re-routing of the portion of the pseudo-wire within that domain (area/level). More directly, each IGP domain manages its interior routing information between network components (e.g., gateways, routers, etc.) within an Autonomous System (AS) (for example, a collection of networks that belong to the same company). The LDP label provides MPLS routers with appropriate routing information to create an end-to-end service that traverses more than a single AS. As used within the related arts, an AS is a collection of connected IP routing prefixes under the control of a single administrative authority that presents a common, clearly defined routing policy to the Internet.

Ring topologies are typically very efficient under heavy network loads, do not require significant routing intelligence, and can be quickly installed, reconfigured, and repaired. A ring network topology is characterized in that each node logically connects to exactly two (2) other nodes, forming a single continuous pathway for data through each node (a ring). Data travels from node to node, with each node between handling every packet. Some variants of ring topologies may overlay multiple logical rings over a physical connection; or alternatively, may implement a ring topology within physical topologies. As should be clear, within the context of the present disclosure, the Layer 2 CPE 308 and Layer 2 Aggregators 310E, 310F are physically located at opposite ends of the distribution network, however by using the tunneling capabilities of distribution network (e.g., MPLS), the nodes are logically directly connected to form a "ring". As used herein, the term "tunnel" refers to the computer networking technique of embedding a first network protocol within the payload of a second network protocol, so as to logically connect two distinct nodes of the same network (operating with the first network protocol) via a connecting network. Tunneling enables e.g., delivery via mixed network technologies, delivery of secure data via unsecure networks, etc.

Unfortunately, a single failure in a ring network can disrupt the entire network, thus ring networks commonly implement multiple levels of redundancy. For example, a ring may be rerouted around a failed node, etc. In one particular instance, ITU-T G.8032 (also referred to as Ethernet Ring Protection Switching (ERPS)) offers sub-50 ms protection and recovery switching for Ethernet traffic for ring topologies. As used herein, ITU-T G.8032 refers to "SERIES G: TRANSMISSION SYSTEMS AND MEDIA, DIGITAL SYSTEMS AND NETWORKS; Packet over Transport aspects—Ethernet over Transport aspects;

SERIES Y: GLOBAL INFORMATION INFRASTRUCTURE, INTERNET PROTOCOL ASPECTS AND NEXT-GENERATION NETWORKS; Internet protocol aspects—Transport; Ethernet ring protection switching", published February 2012 and incorporated herein by reference in its entirety, which describes protection switching mechanisms, loop prevention, and communication protocols for ring networks. ITU-T G.8032 specifically defines: (i) loop avoidance mechanisms, and (ii) learning, forwarding, and Filtering Database (FDB) mechanisms defined in the Ethernet flow forwarding function (ETH_FF).

As described within the aforementioned standard, ITU-T G.8032 mandates that data traffic may flow on all but one of the ring links. The unencumbered link is called the Ring Protection Link (RPL), and under normal conditions the RPL link is blocked, i.e. not used for service traffic. One designated Ethernet Ring Node (the RPL Owner Node), is responsible for blocking traffic at one end of the RPL. Under an Ethernet ring failure condition, the RPL Owner Node unblocks its end of the RPL (unless the RPL has failed) allowing the RPL to be used for traffic. The ring failure triggers protection switching of the traffic onto the RPL. Extant ITU-T G.8032 implementations are required (and able) to switchover within 50 ms of a failure event.

Within the context of FIG. 3A, the primary standby EVC is blocked by the Layer 2 CPE 308 during normal operation, but during failover the primary standby EVC connects the Layer 2 CPE 308, to the distribution hubs (from 304B to 304D) to the second Layer 2 Aggregator 310F, then to the second Layer 2 Aggregator 310E. Similarly, the secondary standby EVC is blocked during normal operation, but during failover connects the Layer 2 CPE 308, to the distribution hubs (from 304A to 304C) to a first Layer 2 Aggregator 310E, then to a second Layer 2 Aggregator 310F. Most notably, because the Layer 2 CPE 308 and Layer 2 Aggregator devices 310E, 310F are operating as an ITU-T G.8032 ring network, the sub-50 ms protection and recovery switching for Ethernet traffic is supported through the distribution network. In other words, unlike prior art solutions which implement ITU-T G.8032 only within the access network and rely on MPLS protection in the distribution network, the present disclosure enables ITU-T G.8032 protection from end-to-end. This is a significant improvement over the existing MPLS protection schemes which are based on Bidirectional Forwarding Detection (BED) which can take several hundred milliseconds to detect and resolve network faults. In some variants, the Layer 2 CPE 308 serves as the Ring Protection Link (RPL) owner to increase ITU-T G.8032 scalability by distributing ring management functionality. Alternatively, one of the Layer 2 Aggregator devices 310E, 310F may be an RPL owner. Furthermore it is appreciated that since each of the ring networks is logically distinct, various hybrid arrangements may be implemented (where some ring networks are managed by the Layer 2 CPE 308, and others are managed by the Layer 2 Aggregator devices 310E, 310F) based on e.g., device capability, network capability, contractual requirements, etc.

Additionally, it should be noted that the Phase III CTBH architecture retains the MPLS core components from Phase II CTBH architecture which significantly reduces the overall cost of migration (CAPEX). The Phase III CTBH only requires the MPLS routers to forward frames (the distribution infrastructure does not interpret, manipulate or otherwise affect the contents of the frame). Consequently, the exemplary Phase III CTBH is not susceptible to multi-vendor interoperability issues for e.g., the aforementioned ITU-T G.8032. In some cases, the MSC Layer 2 Aggregators 310E, 310F may be paired with the same vendor's Layer 2 CPE 308 (the intervening distribution infrastructure may be commodity components) to simplify the systems integration efforts associated with Fault, Configuration, Accounting, Performance and Security (FCAPS) Management functions that would otherwise be complicated by disparate vendor equipment at each end of a service.

Still further, those of ordinary skill in the related arts will readily appreciate that the tunneled link between the nodes of the ring network provides multiple additional benefits. Each tunnel operates as a direct logical connection (e.g., without higher level network routing, and/or unpredictable delays). Thus, the two ends of the tunneled link can support timing constraints which may otherwise be untenable. For example, a Layer 2 CPE device (such as a cellular tower) with a tunnel to a Layer 2 Aggregator of the Core Network can transact time sensitive messaging (such as IEEE 1588 synchronization messages which are required for Carrier Ethernet installations) for CTBH applications (LTE, LTE-Advanced, 4G etc.)

Similarly, from a network management perspective, by providing each Layer 2 CPE device with its own tunneled logical ring, the nodes of each ring can individually monitor performance, activate/deactivate service, and/or test capabilities without affecting the other logical rings. For example, a first ring network may consist of: a first Layer 2 CPE, a first Layer 2 Aggregator, and a second Layer 2 Aggregator; a second ring network may consist of: a second Layer 2 CPE, the same first Layer 2 Aggregator, and the same second Layer 2 Aggregator; a third ring network may consist of a third Layer 2 CPE, and the same Layer 2 Aggregators. Each of the first second and third ring networks are individually tunneled. Where, the first Layer 2 CPE 308 is the RPL owner, the Layer 2 CPE 308 can activate/deactivate its ring network (the first ring network) without affecting the other Layer 2 CPEs. Similarly, where a Layer 2 Aggregator device 310E, 310F is the RPL owner, Layer 2 Aggregator device can individually activate/deactivate each ring networks associated with a Layer 2 CPE 308 without affecting the other Layer 2 CPEs. Such functionality enables layered network re-convergence (i.e., consolidation of network infrastructure technologies) in that the addition (or removal) of a Layer 2 CPE can be handled without disrupting existing networks.

Finally, as shown, each Layer 2 Aggregator 310E, 310F provides an aggregated (or trunked) data link to the MSC, and each Layer 2 CPE 308 provides a data link to the cell tower 302. The trunked bandwidth is sized sufficiently to accommodate the total number of Layer 2 CPEs. For example, a 10 Gb/s data trunk can support: up to one hundred (100) Layer 2 CPEs with 100 Mb/s links; up to fifty (50) Layer 2 CPEs with 200 Mb/s links, etc. While the foregoing data links are undifferentiated between Layer 2 CPEs, it is appreciated that a Layer 2 Aggregator is in no way so limited, and may freely aggregate data links of different bandwidths from different Layer 2 CPEs. Still other implementations of the Layer 2 Aggregators may reserve a first portion of bandwidth for legacy operation, and a second portion of bandwidth for operation in accordance with the various principles described herein (e.g., tunneled Ethernet ring networks). Similarly, Layer 2 Aggregators may maintain Class of Service (CoS) requirements independently for each EVC. Common implementations of CoS include e.g., standard queuing mechanisms based on a priority field of an IEEE 802.1Q tag (included within an Ethernet frame) and/or the so-called MPLS experimental (EXP) field (which is commonly used to ensure CoS through the transport or network).

Figure 3B:
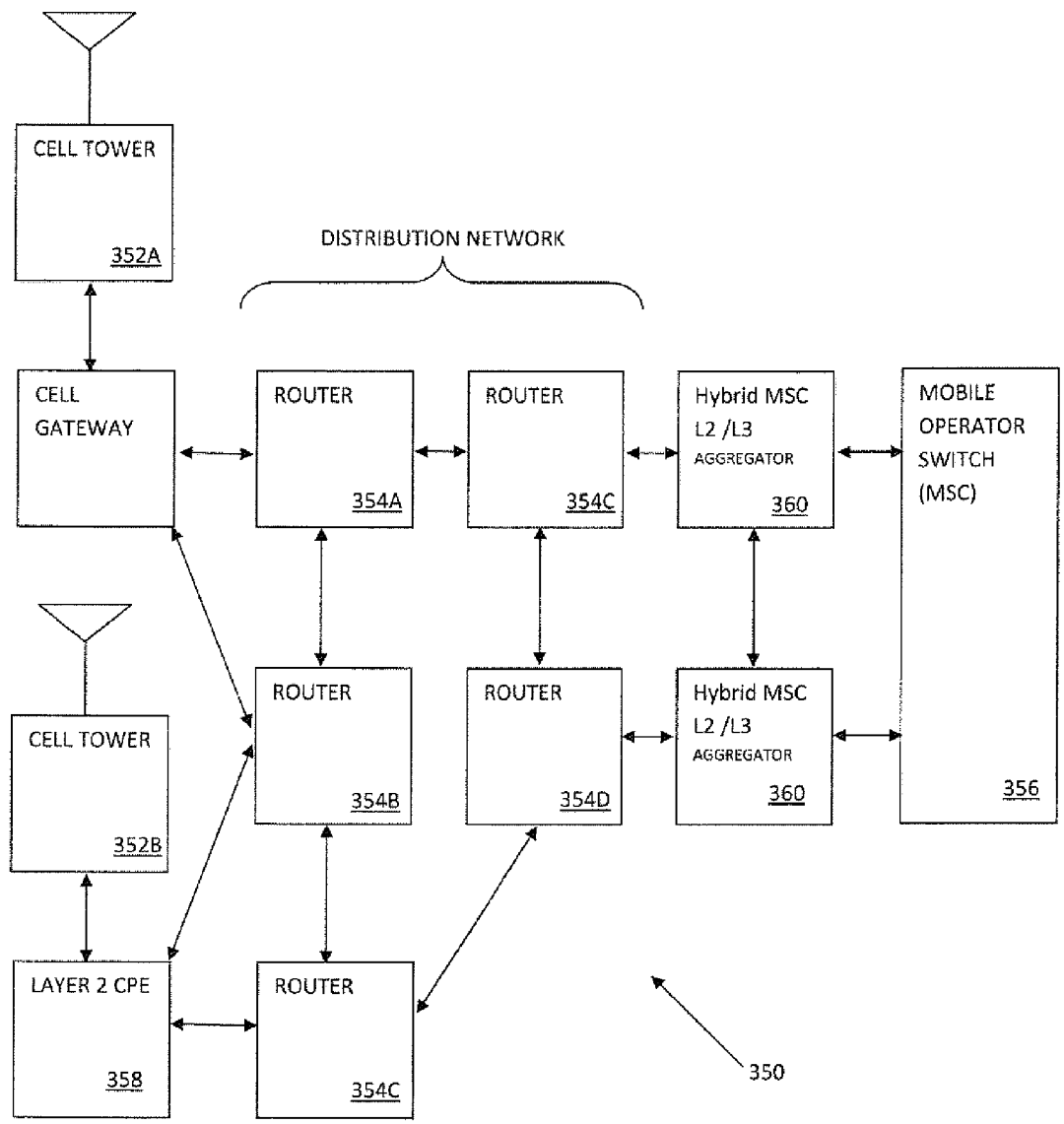
FIG. 3B is a detailed logical block diagram of an exemplary heterogeneous Phase II/Phase III CTBH architecture, in accordance with various aspects of the present disclosure.

As shown in FIG. 3B, a representation of a combination of Phase II CTBH and Phase III CTBH architecture is provided to demonstrate interoperability. The first cell site 352A communicates with associated distribution hubs 354A, 354B and hybrid Layer 2/3 Aggregators 360 via legacy Ethernet point-to-point links. In parallel, the second cell site 352B operates via the aforementioned tunneled Ethernet ring network operation in communication with the Layer 2 CPE 358 and hybrid Layer 2/3 Aggregators 360. The hybrid Layer 2/3 Aggregators combine the data links into a trunked data link for the MSC, allowing both the MPLS and IEEE 802.1Q frames to traverse the same Ethernet links between the MSC Layer 2 Aggregators 360 and the penultimate routers 354C, 354D.

Methods—

Figure 4:
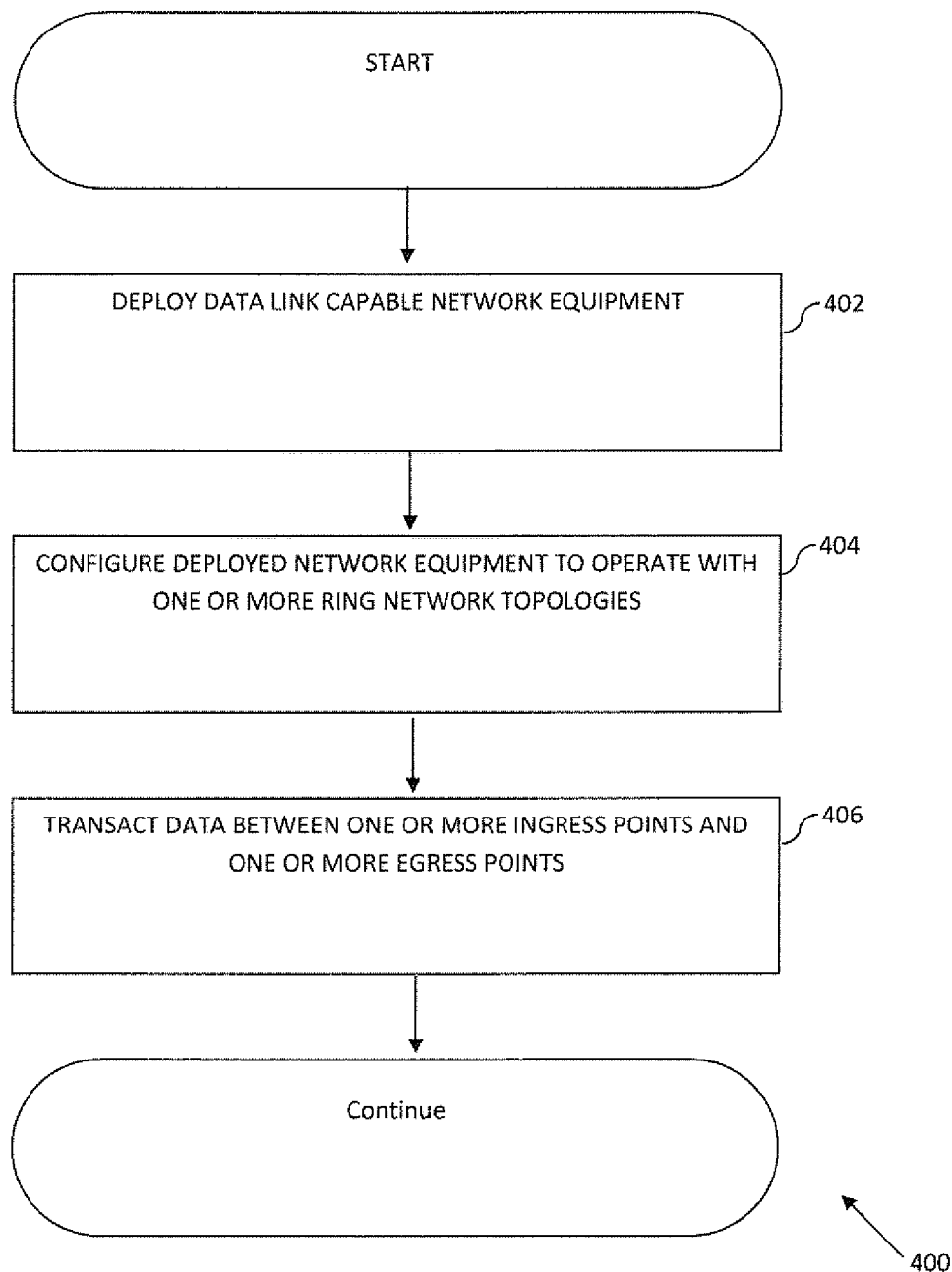
FIG. 4 is a logical flow diagram of one embodiment of a generalized method for intelligent deployment and transition from a first network infrastructure to a second network infrastructure, in accordance with various aspects of the present disclosure.

Referring now to FIG. 4, one generalized method 400 for intelligent deployment and transition from a first network infrastructure to a second network infrastructure.

At step 402 of the method 400, data link capable network equipment is deployed. Common examples of network equipment include e.g., routers, switches, Layer 2 Consumer Premises Equipment (CPE), Multiprotocol Label Switching (MPLS) transport routers, Network Interface Device (NID), and Layer 2 Aggregator devices etc.

For example, in one exemplary embodiment, the following network entities are deployed, one or more Layer 2 CPE (coupled to e.g., a cellular tower), a plurality of MPLS network routers, and one or more Layer 2 Aggregators (coupled to e.g., a Mobile Services Provider (MSP)). The Layer 2 CPE and Layer 2 Aggregators connect to the ingress and/or egress points for a "tunnel"; where the tunnel connects two (2) distinct portions of a logical network. These logical tunnels enable the aforementioned backhaul capabilities (high speed transfers of large amounts of data between the one or more Layer 2 CPE and the one or more Layer 2 Aggregators).

Those of ordinary skill in the related arts will readily appreciate that the presented deployment is merely illustrative, and in no way limits the myriad of network deployments that are possible given the contents of the present disclosure. Moreover it should be appreciated that "staged" deployments are commonly used in practical implementations (e.g., where budgetary considerations preclude massive capital and/or operational investments). For example, in one such deployment scheme, a first deployment stage may include installing a plurality of Layer 2 capable network routers. At a later point, a second deployment stage may include installation of Layer 2 Aggregators. Subsequently thereafter, a third deployment stage may include installation of Layer 2 capable CPE.

At step 404 of the method 400, the deployed network equipment is configured to operate according to one or more ring network topologies. Each ring network minimally comprises three (3) network nodes which are arranged such that each network node connects to exactly two (2) other nodes. The ring network is configured so as to support a single continuous pathway for signals through each node (i.e., a "ring"). In one exemplary embodiment, each ring network is characterized by a path from a Layer 2 CPE, to a first Layer 2 Aggregator, to a second Layer 2 Aggregator, back to the Layer 2 CPE. Those of ordinary skill in the related arts will readily appreciate that other network topologies (which conform to ring network constraints) are equally suitable (e.g., two (2) Layer 2 CPEs and two (2) Layer 2 Aggregators, three (3) Layer 2 CPEs and two (2) Aggregators, etc.).

Additionally, exemplary implementations may further augment the active ring network with one or more back-up ring networks for use during a failover condition. Back-up ring networks may share the same components or alternately incorporate one or more other components. For example, a Layer 2 CPE may have a first active ring network with a first set of Layer 2 Aggregators which also provide a second logical standby ring network for failover conditions. In other cases, the Layer 2 CPE may have a standby ring network which has different Layer 2 Aggregators, from its active ring network.

As previously described, the data link layer (Layer 2) is the protocol layer that transfers data between adjacent network nodes in a network. Specifically, the data link layer is concerned with local delivery of data between devices. Data link frame data does not cross the boundaries of a local network (and does not require network address resolution). To clarify, network routing and global addressing are handled within the network layer (Layer 3), whereas the data link layer protocols focus on local delivery (next "hop" delivery), and medium access control. Traditionally, data link layer delivery is based on unambiguous addresses. For example, the frame header contains source and destination addresses that uniquely identify a source device and a destination device. In contrast to the hierarchical and routable addresses of the network layer, the data link layer addresses are "flat" i.e., no part of the address can be used to identify the logical or physical group to which the address belongs on the LAN segment.

Various data link protocols may provide different levels of complexity and/or functionality. For example, certain data link protocols may incorporate error checking/correction (e.g., bit error rate (BER), block error rate (BLER), packet error rate (PER), cyclic redundancy check (CRC), parity, forward error correction (FEC), checksum, etc.), acknowledgement/non-acknowledgment (ACK/NACK), flow control, etc.

Consider the following deployment: a plurality of Layer 2 CPEs is supported by two (2) Layer 2 Aggregator devices. Each one of the plurality of Layer 2 CPEs has a distinct logical ring network that consists of itself and the two (2) Layer 2 Aggregator devices. The logical ring network is tunneled (e.g., the aforementioned MPLS transport routers) at the data link layer (Layer 2) thus, from Layer 3 and above (e.g., network and transport layers (transport control protocol/internet protocol (TCP/IP), etc.) the nodes of the ring network are "directly" connected.

In one exemplary embodiment, the ring network is configured to support at least a primary path (e.g., a primary EVC), and a secondary path (e.g., a secondary EVC), each path is further backed with a standby path (e.g., a primary standby EVC, and a secondary standby EVC). The ring network includes ITU-T G.8032 switch mechanisms which are configured to automatically switch between the active paths and the standby paths when a failure has been detected (e.g., where the ring is broken). Moreover, it should be appreciated that physical redundancy may provide yet another layer of protection; for example, multiple physically redundant network routers may be switched in to replace failing network routers, etc.

In slightly more detail, the ring network is established according to the ITU-T G.8032 Ethernet Ring Protection Switching (ERPS). ERPS is one exemplary implementation of Automatic Protection Switching (APS) at the service VLAN level (not the port level); one path is blocked while the other remains active. In APS, each ring is a domain, which is characterized by a single "master node" and many "transit nodes". Each node will have a primary port and a secondary port, both ports are able to send control traffic to the master node; however, under normal operation only the primary port on the master node is used (the secondary port is blocked for all non-control traffic). When the ring fails, the devices that detect the failure send a control message to the master node, and the master unblocks the secondary port and instructs the nodes to flush their current transmit queues and reconfigure for secondary port operation.

Referring back to the exemplary embodiment, the entire ring network is constructed from "pseudo-wires" between each of the nodes of the ring network. This "direct" connection provides multiple advantages. Firstly, failover mechanisms are greatly simplified. Since each node of the ring network is logically directly connected, an error is immediately and unambiguously detected (e.g., a missed frame, etc.). For example, within the context of networks which utilize ITU-T G.8032 Ethernet ring protection, the described architecture enables any of the components to detect and trigger failover recovery within 50 ms of a failure event.

Secondly, it should be appreciated that since each node of the ring network can directly monitor network traffic and/or measure error rates, the overall network can be constructed from commodity components. More directly, many manufacturers provide network diagnostic software which may not integrate properly with other manufacturer's software; integration problems have traditionally prevented multi-sourcing of network infrastructure. In contrast, the various embodiments described herein enables each of the nodes to directly monitor/measure/diagnose traffic based on the standardized Ethernet frame (based on e.g., preamble, frame delimiter, MAC destination address, MAC source address, data payload, and frame check sequence, etc.)

Thirdly, those of ordinary skill in the related arts will readily appreciate that these pseudo-wires behave as a direct logical connection (e.g., without higher level network routing, and/or unpredictable routing delays). Thus, a device coupled to one end of a pseudo-wire is directly connected to a device coupled to the other end of the pseudo-wire. This logically direct linkage can greatly simplify timing critical messaging. For example, a Layer 2 CPE device (such as a cellular tower) with a pseudo-wire to the Layer 2 Aggregator of the Core Network can rely on the stability offered by the pseudo-wire to facilitate time sensitive messages e.g., IEEE 1588 timing synchronization, etc. when coupled with existing queuing mechanisms that prioritize timing frames based on the priority field (e.g., the aforementioned IEEE 802.1Q tag and/or MPLS EXP field).

In one exemplary embodiment, the Ethernet frames are tunneled via Multiprotocol Label Switching (MPLS). MPLS provides a high speed transport for variable length frames. The frames are routed according to one or more labels which may define various tiers of e.g., source, destination, etc. As the frames are routed from one MPLS router to another, the labels may be replaced and rerouted. Since MPLS only requires full network address resolution for connection establishment, routing can be performed at very high speeds and with minimal network overhead. Additionally, the variable length packets of MPLS can support virtually any data encapsulation; only the MPLS labels are modified in transit, the encapsulated data is not altered during transit.

At step 406 of the method 400, the deployed ring networks transact data between one or more ingress points (e.g., the cellular tower, etc.) and one or more egress points (e.g., the MSP routers, etc.). In one exemplary embodiment, each Layer 2 CPE services a cellular tower, and two (2) Layer 2 Aggregator devices are connected to the MSP routers. In this manner, the MSP routers can support multiple cellular towers (each protected with a distinct ring network in the backhaul provider network). By maintaining a distinct ring network for each cellular tower, the MSP routers can incrementally add, remove, and/or update each of the cellular towers without adverse affect to the other networks. While the exemplary discussions herein are directed to a point-to-point type tunnel (e.g., between the cellular tower and the MSP) implemented within a ring network, it is appreciated that a ring topology may readily encompass any number of logical entities. For example, the ring may support multiple cellular towers and/or MSP. One common example of such a configuration is a so-called "daisy chain" of nodes, other examples include e.g., trees, hubs, etc.

Apparatus—

Figure 5:
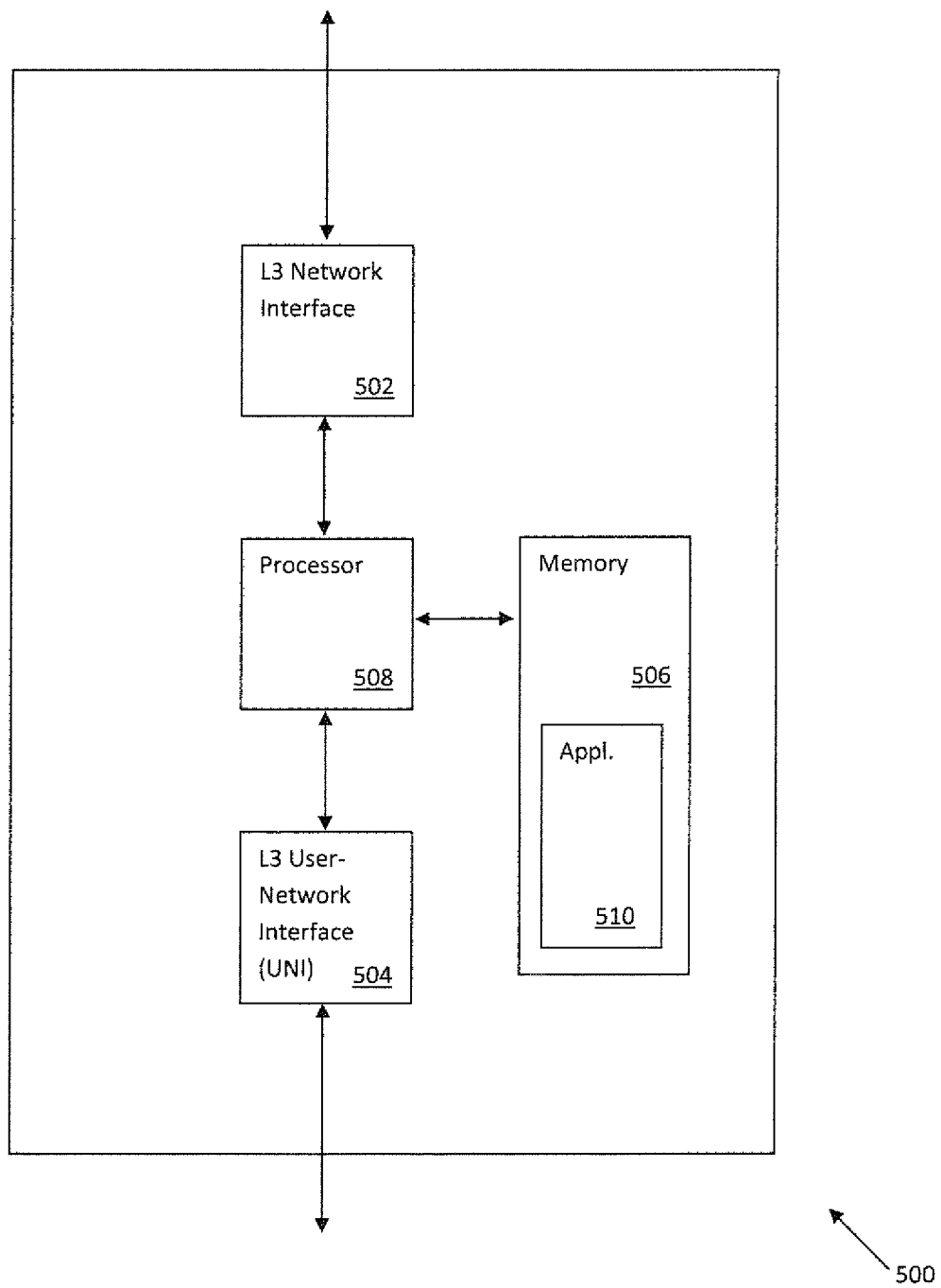
FIG. 5 is a logical block diagram of an exemplary embodiment of a Consumer Premises Equipment (CPE) configured to provide networked operation in conjunction with the generalized architecture of FIGS. 3A and 3B.
Figure 6:
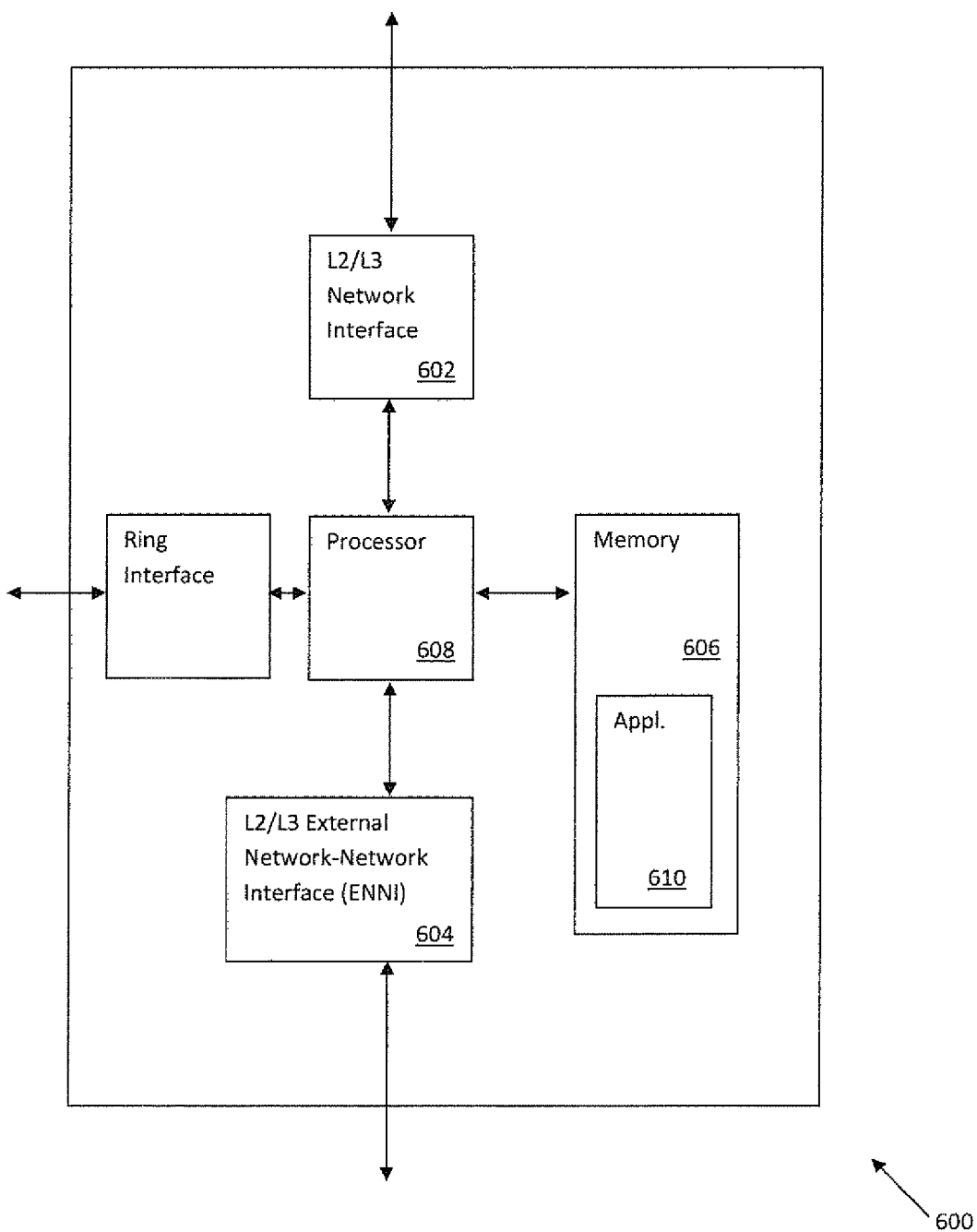
FIG. 6 is a logical block diagram of an exemplary embodiment of a Layer 2 Aggregator device configured to provide networked operation in conjunction with the generalized method architecture of FIGS. 3A and 3B.
Figure 7:
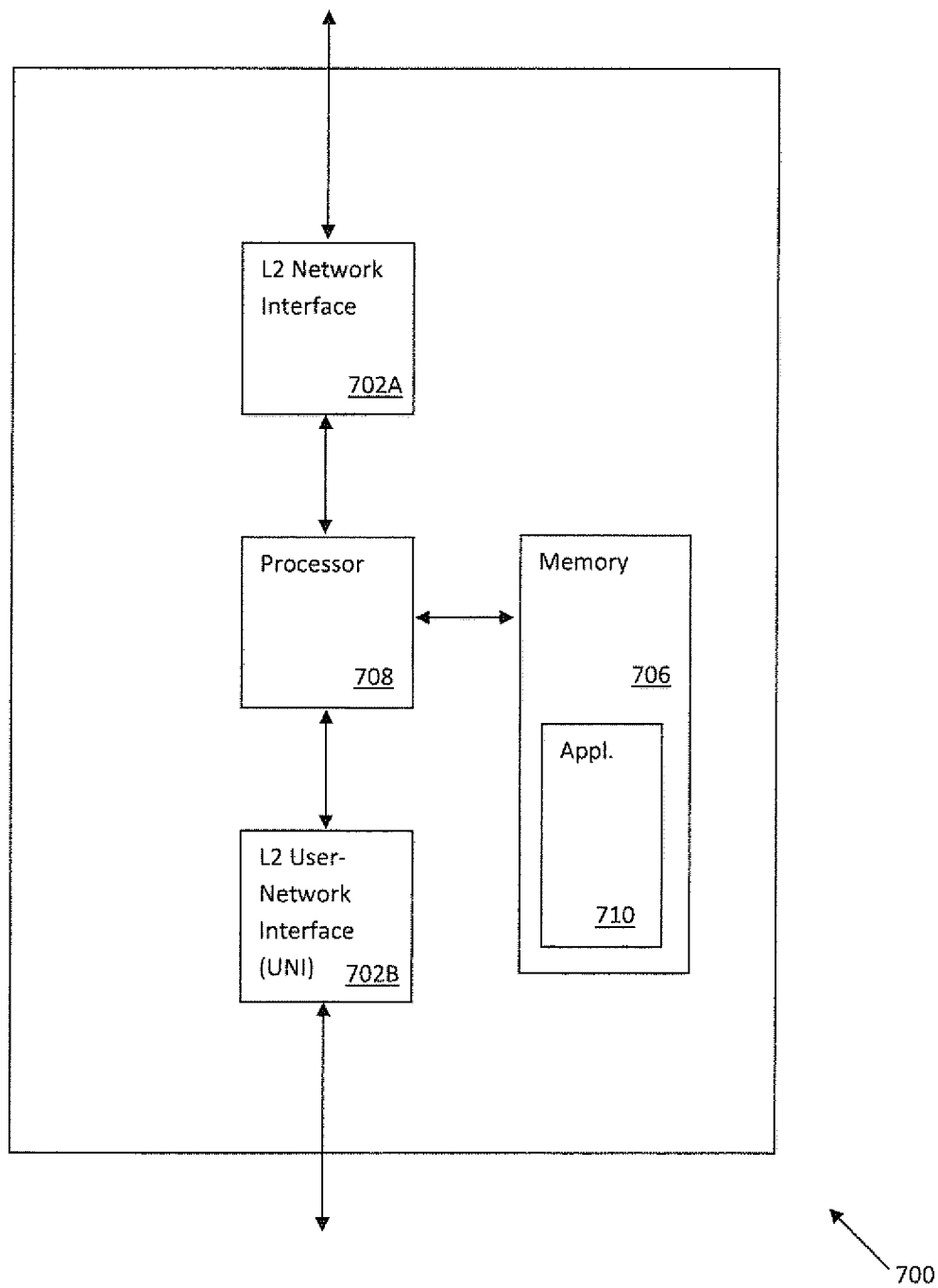
FIG. 7 is a logical block diagram of an exemplary embodiment of a Layer 2 Network Interface Device configured to provide networked operation in conjunction with the generalized architecture of FIGS. 3A and 3B.

Referring now to FIGS. 5, 6, and 7, exemplary network components useful in conjunction with the various methods described herein are illustrated.

Exemplary Consumer Premises Equipment (CPE)—

FIG. 5 is a block diagram illustrating an exemplary embodiment of a Consumer Premises Equipment (CPE) 500 for use in providing networked operation in conjunction with the generalized architecture of FIGS. 3A and 3B. As shown, the Layer 2 CPE generally comprises a Layer 2 capable network interface 502 configured to interface a backhaul network, a consumer premises interface 504, a processor 508 and associated storage 506 (discussed in greater detail below). While the term CPE is used herein, it should be readily appreciated that the following discussion is broadly applicable to any "last mile" type device which is configured to provide the final source and destination type forwarding of customer data. Common examples of such last mile type devices include e.g., cellular towers, gateways, consumer equipment, etc.

The Layer 2 capable network interface 502 provides, inter alia, content and data delivery to and from a backhaul type network, such as the herein described Layer 2 based ring network, traditional legacy networks, and/or hybrids thereof, etc. The premises interface 504 provides inter alia, communication between the CPE 500 and various devices within the consumer premises, such as e.g., client mobile devices, Internet Protocol (IP) enabled devices, gateways, etc. For example, the premises interface 504 may be used to connect to a cellular site, base station (BS), home gateway, multi-home gateway, etc.

The processor 508 may include one or more of a digital signal processor, microprocessor, field-programmable gate array, or plurality of processing components mounted on one or more substrates. The processing subsystem 508 may also comprise an internal cache memory. The processing subsystem is in communication with a memory subsystem 506, the latter including memory which may for example comprise SRAM, flash, and/or SDRAM components. The memory subsystem may implement one or more of DMA type hardware, so as to facilitate data accesses as is well known in the art. The memory subsystem of the exemplary embodiment contains computer-executable instructions which are executable by the processor subsystem.

In the illustrated embodiment, the processor 508 is configured to run a virtual network application 510 thereon. The virtual network application 510 is configured to: (i) receive premises traffic that is addressed to a network entity outside of the premises and package the traffic for transmission via the Layer 2 capable network interface 502 (coupled to a Layer 2 ring network based backhaul); and (ii) receive Layer 2 ring network based packets that encapsulate data and determine if the encapsulated data includes data that should be forwarded via the premises network.

In one embodiment, the premises interface 504 is configured to transact one or more network address packets with other networked devices according to a network protocol. As is commonly implemented within the related arts, network addressing provides each node of a network with an address that is unique to that network; the address can be used to communicate (directly, or indirectly via a series of "hops") with the corresponding device. In more complex networks, sub-networks may be used to assist in address exhaustion (e.g., one address is logically divided into another range of network addresses). Common examples of Open Systems Interconnection (OSI) based network routing protocols include for example: Internet Protocol (IP), Internetwork Packet Exchange (IPX), and OSI based network technologies (e.g., Asynchronous Transfer Mode (ATM), Synchronous Optical Networking (SONET), Synchronous Digital Hierarchy (SDH), Frame Relay, etc.)

In one embodiment, the Layer 2 capable network interface 502 is configured to transact one or more data link frames with other Layer 2 capable devices according to a data link protocol. In some variants, the Layer 2 capable network interface 502 is additionally configured to transact one or more network address packets with other networked devices according to a network protocol (e.g., Layer 3 capabilities), to support management of the CPE 500.

In one exemplary embodiment, the exemplary Layer 2 CPE is configured to connect to one or more other Layer 2 devices via a tunneled ring network. The Layer 2 CPE is configured to transact data via the ring network, perform failover switching, and/or measure and monitor data traffic. Generally, the Layer 2 CPE is configured to connect access networks (e.g., consumer or network operator equipment) to the backhaul network. For example, in one exemplary embodiment, the Layer 2 CPE is coupled to a cellular tower site. In other embodiments, the Layer 2 CPE provides network connectivity for a small business premises and/or residential premises.

Exemplary Layer 2 Aggregator Device—

FIG. 6 is a block diagram illustrating an exemplary embodiment of a Layer 2 Aggregator device 600 for use in providing networked operation in conjunction with the generalized architecture of FIGS. 3A and 3B. As shown, the aggregator device 602 generally comprises a Layer 2 capable network interface 602, a backbone interface 604 (also referred to as an External Network-Network Interface (ENNI)), a processor 608, and an associated storage device 606 (described in greater detail below).

The Layer 2 capable network interface 602 provides, inter alia, content and data delivery to and from a backhaul type network, such as the herein described Layer 2 based ring network, traditional legacy networks, and/or hybrids thereof, etc. The backbone interface 604 provides inter alia, communication between the Layer 2 Aggregator device and a destination network. In some cases, the destination network may be the mobile service provider (MSP). In other implementations, the Layer 2 network interface may provide access to the broader Internet backbone. Generally, it is appreciated that the Internet backbone refers to the principal data routes between large, strategically interconnected networks and core routers on the Internet hosted by e.g., commercial, government, academic and other high-capacity network centers, etc.

In some embodiments, the Layer 2 Aggregator device 600 may additionally include a distinct ring interface (not shown) used to interconnect the L2 Aggregator device 600 to another Layer 2 Aggregator device 600 in the Mobile Switching Center (MSC). In other embodiments, the ring interface may be implemented via the Layer 2 capable network interface 602, a second Layer 2 capable network interface, or the backbone interface 604.

The processor 608 may include one or more of a digital signal processor, microprocessor, field-programmable gate array, or plurality of processing components mounted on one or more substrates. The processing subsystem 608 may also comprise an internal cache memory. The processing subsystem is in communication with a memory subsystem 606, the latter including memory which may for example comprise SRAM, flash, and/or SDRAM components. The memory subsystem may implement one or a more of DMA type hardware, so as to facilitate data accesses as is well known in the art. The memory subsystem of the exemplary embodiment contains computer-executable instructions which are executable by the processor subsystem.

In the illustrated embodiment, the processor 608 is configured to run a virtual network application 610 thereon. The virtual network application 610 is configured to: (i) receive traffic that is addressed to a network entity within the premises associated with a CPE and package the traffic for transmission via the Layer 2 capable network interface 602 (coupled to a Layer 2 ring network based backhaul); and (ii) receive Layer 2 ring network based packets that encapsulate data and determine if the encapsulated data includes data that should be routed via the backbone interface 604.

In one embodiment, the ENNI 604 is configured to transact one or more network address packets with other networked devices according to a network protocol. In one exemplary embodiment, the backbone interface 604 is directly coupled to the MSP's network routers.

In one embodiment, the Layer 2 capable network interface 602 is configured to transact one or more data link frames with other Layer 2 capable devices according to a data link protocol. In some variants, the Layer 2 capable network interface 602 is additionally configured to transact one or more network address packets with other networked devices according to a network protocol (e.g., Layer 3 capabilities), where network capabilities are useful in hybrid deployments (e.g., where the backhaul may incorporate a combination of Layer 2 and Layer 3 network components).

In one embodiment, each Layer 2 Aggregator device is configured to connect to one or more other Layer 2 devices via a tunneled ring network. The Layer 2 Aggregator is configured to transact data via the ring network interface, perform failover switching, and/or measure and monitor data traffic. Generally, the Layer 2 Aggregator is configured to connect the backhaul network to the core network. For example, in one exemplary embodiment, the Layer 2 Aggregator is coupled to one or more MSP routers. The Layer 2 Aggregator further combines or "aggregates" the serviced Consumer Premises Equipment (CPE). In some embodiments, the Layer 2 Aggregator only services Layer 2 CPEs; alternatively, the Layer 2 Aggregators can service a mixed population of both Layer 2 CPEs and legacy (Layer 3) CPEs.

Exemplary Layer 2 Network Interface Device—

FIG. 7 is a block diagram illustrating an exemplary embodiment of a Layer 2 Network Interface device 700 for use in providing networked operation in conjunction with the generalized architecture of FIGS. 3A and 3B. As shown, the network interface device 700 generally comprises a first and second Layer 2 capable network interface 702A and 702B, a processor 708, and an associated storage device 706 (described in greater detail below).

The Layer 2 capable network interface 702A and 702B provide, inter alia, content and data forwarding within a backhaul type network, such as the herein described Layer 2 based ring network, traditional legacy networks, and/or hybrids thereof, etc. In one exemplary embodiment, the Layer 2 data protocol comprises an IEEE 802.3 Ethernet protocol.

The processor 708 may include one or more of a digital signal processor, microprocessor, field-programmable gate array, or plurality of processing components mounted on one or more substrates. The processing subsystem 708 may also comprise an internal cache memory. The processing subsystem is in communication with a memory subsystem 706, the latter including memory which may for example comprise SRAM, flash, and/or SDRAM components. The memory subsystem may implement one or a more of DMA type hardware, so as to facilitate data accesses as is well known in the art. The memory subsystem of the exemplary embodiment contains computer-executable instructions which are executable by the processor subsystem.

In the illustrated embodiment, the processor 708 is configured to run a data link layer ring network application 710 thereon. The ring network application 710 is configured to: (i) receive traffic that includes a VLAN tag associated with the device 700, and encapsulated data; and (ii) add a VLAN tag associated with a neighbor node of the ring network and forward the traffic to the neighbor node.

In one embodiment, the Layer 2 capable network interfaces 702A and 702B are configured to transact one or more data link frames with other Layer 2 capable devices according to a data link protocol. In some "hybrid" variants, the network interfaces 702A and 702B are additionally configured to transact one or more network address packets with other networked devices according to a network protocol (e.g., Layer 3 capabilities), where network capabilities are useful in hybrid deployments (e.g., where the backhaul may incorporate a combination of Layer 2 and Layer 3 network components).

Example Operation

Figure 8:
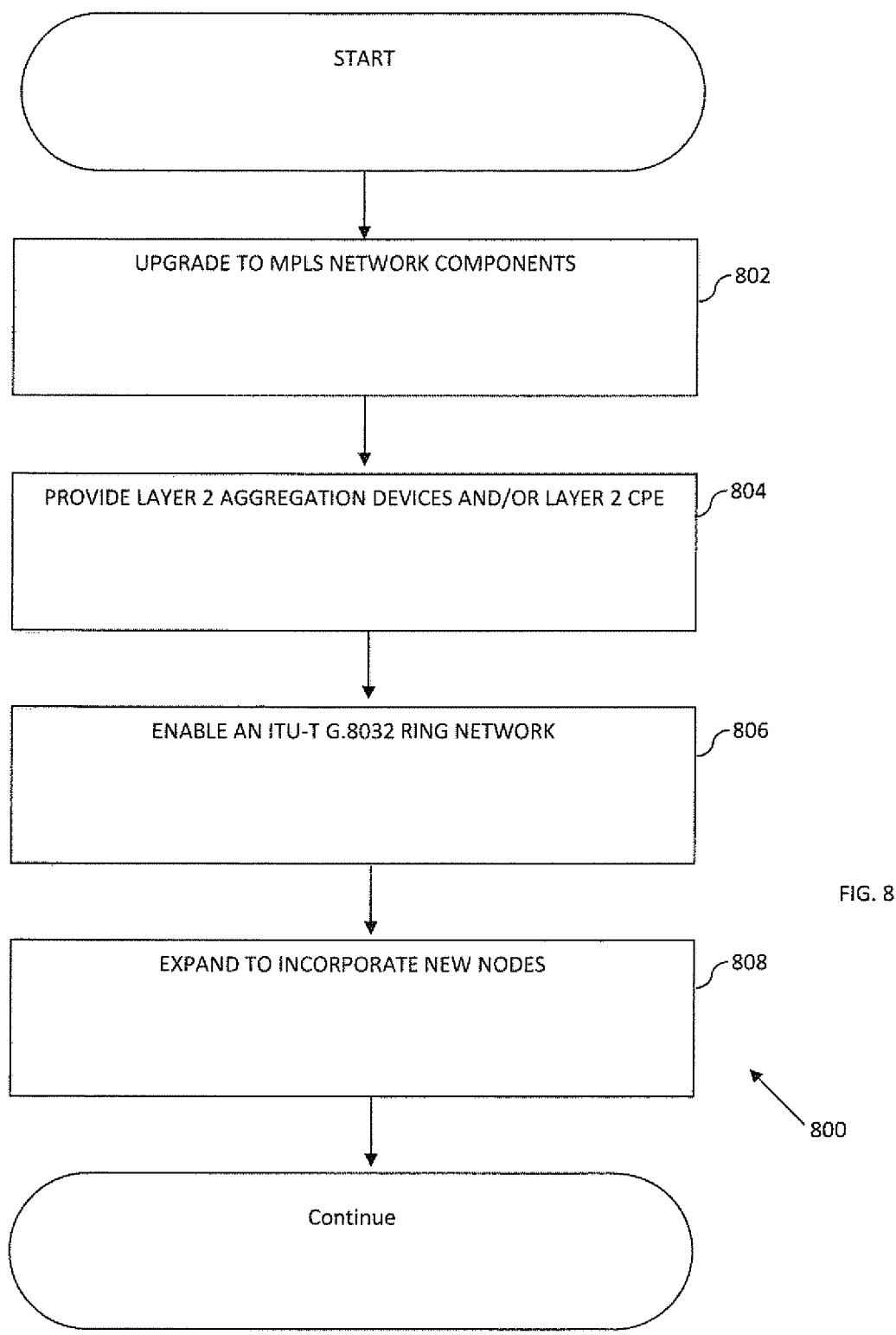
FIG. 8 is a logical block diagram of one exemplary embodiment of a method for implementing an ITU-T G.8032 ring network within a backhaul distribution network with MPLS capability, in accordance with various aspects of the present disclosure.

Referring now to FIG. 8, one exemplary method 800 for implementing an ITU-T G.8032 ring network within a backhaul distribution network with MPLS capability is illustrated.

At step 802 of the method 800, a backhaul provider upgrades its distribution networks to MPLS network routers; throughout the upgrade rollout, the distribution network routes data according to fixed LDP tunnels to assure appropriate QoS.

At step 804 of the method 800, the backhaul provider upgrades appropriate endpoints with Layer 2 aggregation devices and/or Layer 2 CPE based on a determined ring network configuration. Determination of upgrade priority may be based on e.g., bandwidth requirements, monetary consideration, network congestion, network planning, etc. For example, in one exemplary embodiment, the backhaul provider may opt to upgrade the endpoints associated with a MSP cellular towers first.

At step 806 of the method 800, enable an ITU-T G.8032 ring network for the appropriate endpoints. The ring network transfers throughout the ring without requiring higher level network address resolution.

At step 808 of the method 800, as additional nodes are equipped, the ring network can be expanded to incorporate new nodes. For example, the backhaul provider may add equipment based on Internet Service Provider (ISP) network traffic.

It will be recognized that while certain aspects of the disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the embodiments disclosed and claimed herein.

While the above detailed description has shown, described, and pointed out novel features of the disclosed embodiments as applied to various systems, it will be understood that various omissions, substitutions, and changes in the form and details of the device or process illustrated may be made by those skilled in the art without departing from the principles described herein. The foregoing description is of the best mode presently contemplated. This description is in no way meant to be limiting, but rather should be taken as illustrative of the general principles of the disclosure. The scope of the disclosure should be determined with reference to the claims.

What is claimed is:

1. A method for operating a content distribution network, said method comprising:
   enabling at least one user interface to communicate with an edge network, said at least one user interface comprising a Multiprotocol Label Switching (MPLS) compliant interface;
   receiving at least one data frame from a first other node of a backhaul network, said backhaul network comprising at least a ITU-T G.8032 compliant logical ring network;
   transmitting said at least one data frame to a second other node of said ITU-T G.8032 compliant logical ring network;
   determining when said at least one data frame comprises at least one packet for said edge network; and
   routing said at least one packet via said edge network;
   wherein said edge network comprises a cellular tower site.

2. A non-transitory computer-readable apparatus comprising media configured to store a computer program thereon, said computer program comprising a plurality of instructions which are configured to, when executed by a processor of a network apparatus:
   receive via an interface of the network apparatus at least one data frame originated from a first node of a backhaul logical ring network, the logical ring network being ITU-T G.8032 compliant;
   insert into said data frame a second label associated with a second node of said logical ring network in place of a first label associated with a network router;
   transmit said at least one data frame to a second node of said backhaul logical ring network;
   determine that said at least one data frame comprises at least one packet for a cellular site associated with an edge network; and
   route at least said at least one packet via said edge network to said cellular site.

3. The method of claim 1, wherein said logical ring network services a combination of retail and carrier Ethernet applications characterized by distinct service level agreements (SLAs).

4. The method of claim 1, wherein said logical ring network comprises at least a first active path in a primary ring, and a second active path in a secondary ring, and said at least one data frame is transacted via said first active path in the primary ring and said second active path in the secondary ring.

5. The method of claim 4, wherein:
said logical ring network further comprises at least a third path in a standby primary ring and a fourth path in a standby secondary ring, said third path and said fourth path being selectively blocked; and
upon detection of a ring failure, at least one of said blocked third path and said fourth path are unblocked, and said at least one data frame is transacted therethrough.

6. The method of claim 1, wherein said routing occurs according to one or more fixed Label Distribution Protocol (LDP) tunnels.

7. The method of claim 1, wherein said determining is based at least in part on a destination Internet Protocol (IP) address found in said at least one packet.

8. The method of claim 1, wherein said at least one data frame comprises encapsulated data and a stack comprising:
  (i) a first stack layer configured to provide routing information;
  (ii) a second stack layer configured to specify a transport network service endpoint;
  (iii) a third stack layer configured to identify an appropriate private network for said encapsulated data; and
  wherein each of said first, second, and third stack layers are associated with corresponding quality of service (QoS) information useful for prioritization within said associated layer.

9. The non-transitory computer-readable apparatus of claim 2, wherein said logical ring network is configured to route said at least one data frame based on associated labels.

10. The non-transitory computer-readable apparatus of claim 2, wherein said at least one data frame comprises encapsulated data and a stack comprising:
  (i) a first stack layer configured to provide routing information;
  (ii) a second stack layer configured to specify a transport network service endpoint;
  (iii) a third stack layer configured to identify an appropriate private network for said encapsulated data; and
  wherein each of said first, second, and third stack layers are associated with corresponding quality of service (QoS) information useful for prioritization within said associated layer.

11. The non-transitory computer-readable apparatus of claim 2, wherein said logical ring network services a combination of retail and carrier Ethernet applications characterized by distinct service level agreements (SLAs).

12. The non-transitory computer-readable apparatus of claim 2, wherein said logical ring network comprises at least a first active path in a primary ring and a second active path in a secondary ring, and said at least one data frame is transacted via said first active path in the primary ring and said second active path in the secondary ring.

13. The non-transitory computer-readable apparatus of claim 12, wherein:
said logical ring network further comprises at least a third path in a standby primary ring and a fourth path in a standby secondary ring, said third path and said fourth path being selectively blocked; and
based at least on detection of a ring failure, at least one of said third path and said fourth path are unblocked, and said at least one data frame is transacted therethrough.

14. The non-transitory computer-readable apparatus of claim 2, wherein said determination is based at least in part on a destination Internet Protocol (IP) address found in said at least one packet.

15. An apparatus, comprising:
a first network interface configured to communicate with a backhaul network comprising at least a logical ring network, said first network interface comprising a Multiprotocol Label Switching (MPLS) compliant interface;
an interface configured to communicate with an edge network;
a processor; and
a non-transitory computer readable medium comprising at least one computer program configured to, when executed by said processor, cause said apparatus to:
  receive at least one data frame from a first other node of said logical ring network, the logical ring network being ITU-T G.8032 compliant;
  transmit said at least one data frame to a second other node of said logical ring network;
  determine when said at least one data frame comprises at least one packet for a cellular site associated with said edge network; and
  route said at least one packet via said edge network to said cellular site.

16. The apparatus of claim 15, wherein said first network interface is further configured to communicate with a Virtual Local Area Network (VLAN), tunneled via said backhaul network.

17. The apparatus of claim 16, wherein said VLAN comprises a first network protocol within a payload of a second network protocol.

18. The apparatus of claim 16, wherein said at least one packet comprises a VLAN packet.

19. The apparatus of claim 18, wherein a second label associated with said second other node of said logical ring network replaces a first label associated to said at least one VLAN packet.

20. The apparatus of claim 15, wherein said logical ring network services a combination of Retail and Carrier Ethernet applications characterized by distinct Service Level Agreements (SLAs).

* * * * *